United States Patent
Breuer et al.

(10) Patent No.: US 11,044,624 B2
(45) Date of Patent: Jun. 22, 2021

(54) METHOD FOR CELLULAR NETWORK BASED CONTROLLING OF MEASUREMENTS BY A LOW-CAPABILITY WIRELESS TERMINAL

(71) Applicant: Gemalto M2M GmbH, Munich (DE)

(72) Inventors: Volker Breuer, Boetzow (DE); Osaid Khaliq, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 6 days.

(21) Appl. No.: 16/330,883

(22) PCT Filed: Sep. 22, 2017

(86) PCT No.: PCT/EP2017/074076
§ 371 (c)(1),
(2) Date: Mar. 6, 2019

(87) PCT Pub. No.: WO2018/060096
PCT Pub. Date: Apr. 5, 2018

(65) Prior Publication Data
US 2019/0215713 A1 Jul. 11, 2019

(30) Foreign Application Priority Data
Sep. 29, 2016 (EP) .................................. 16191535

(51) Int. Cl.
*H04W 24/10* (2009.01)
*H04W 4/70* (2018.01)
(Continued)

(52) U.S. Cl.
CPC ............ *H04W 24/10* (2013.01); *H04W 4/70* (2018.02); *H04W 16/18* (2013.01); *H04W 48/16* (2013.01);
(Continued)

(58) Field of Classification Search
None
See application file for complete search history.

(56) References Cited

U.S. PATENT DOCUMENTS

2015/0117233 A1  4/2015  Wong et al.
2017/0374574 A1* 12/2017  Lee ....................... H04W 16/24
(Continued)

FOREIGN PATENT DOCUMENTS

WO  2016/108504 A1  7/2016
WO     2016111229 A1  7/2016

OTHER PUBLICATIONS

ZTE, "Further considerations on CSI feedback for MTC enhancement", 3GPP TSG-RAN WG1 Meeting #83, RI-156667, Anaheim, US, Nov. 15-22, 2015.(9 pages).
(Continued)

*Primary Examiner* — Saumit Shah
(74) *Attorney, Agent, or Firm* — Buchanan Ingersoll & Rooney PC (57) ABSTRACT

The present invention relates to a method for controlling at least one measurements by a base node of a cellular network, the base node serving at least one low-capability wireless terminal in an open connection in coverage enhancement mode, the method comprising the steps of: determining the coverage enhancement level of said wireless terminal, estimating a measurement time for carrying out said at least one measurement taking into account said coverage enhancement level, sending a measurement request message in conjunction with a suspend connection message to the wireless terminal, providing a resume indication to the wireless terminal considering said estimated measurement time, and retrieving at least one measurement response message from the wireless terminal comprising the at least one requested measurement.

11 Claims, 3 Drawing Sheets

(51) Int. Cl.
*H04W 48/16* (2009.01)
*H04W 16/18* (2009.01)
*H04W 48/20* (2009.01)
*H04W 74/08* (2009.01)

(52) U.S. Cl.
CPC ....... *H04W 48/20* (2013.01); *H04W 74/0833* (2013.01)

(56) References Cited

U.S. PATENT DOCUMENTS

| | | | |
|---|---|---|---|
| 2018/0255597 A1* | 9/2018 | Yu | H04W 74/08 |
| 2019/0182794 A1* | 6/2019 | Wong | H04W 64/00 |

OTHER PUBLICATIONS

Huawei, "MTC UE power consumption reduction", 3GPP TSG-RAN WGI Meeting #80bis, RI-151883, Belgrade, Serbia, Apr. 20-24, 2015. (4 pages).

Ericsson, "Activation of Idle Gaps for Handover Measurements in E-UTRAN", 3GPP TSG-RAN WG2 #60, R2-074896, Jeju, Korea, Nov. 5-9, 2007. (8 pages).

Office Action (Notice of Reasons for Rejection) dated Apr. 14, 2020, by the Japan Patent Office in corresponding Japanese Patent Application No. 2019-512720 and English translation of the Office Action. (5 pages).

International Search Report (PCT/ISA/210) dated Dec. 20, 2017, by the European Patent Office as the International Searching Authority for International Application No. PCT/EP2017/074076.

Mikko Saily et al., "Mobile and wireless communications Enablers for the Twenty-twenty Information Society—II Deliverable D6.1 Draft Asynchronous Control Functions and Overall Control Plane Design" Jun. 30, 2016, pp. 1-120.

Written Opinion (PCT/ISA/237) dated Dec. 20, 2017, by the European Patent Office as the International Searching Authority for International Application No. PCT/EP2017/074076.

Office Action (Communication pursuant to Article 94(3) EPC) dated Apr. 23, 2021, by the European Patent Office in corresponding European Patent Application No. 17772400.2. (6 pages).

3GPP TS 36.300 v14.0.0 (Sep. 2016) 3rd Generation Partnership Project "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", (3GPP), Mobile Competence Centre ; 650 Route des Lucioles—Sophia Antipolis Valbonne, France.

* cited by examiner

METHOD FOR CELLULAR NETWORK BASED CONTROLLING OF MEASUREMENTS BY A LOW-CAPABILITY WIRELESS TERMINAL

FIELD OF THE INVENTION

The present invention relates to a method for controlling measurements by a base node of a cellular network. The invention also pertains to a base node using said method.

The invention further relates to a method for executing measurements by a wireless terminal. The invention also pertains to a wireless terminal using said method.

BACKGROUND OF THE INVENTION

In the field of cellular wireless communication the technology standards are dedicated for supporting low-capability devices. The standard in particular comprise technologies like narrowband-IoT (NB-IoT), which is under definition at the ETSI.

Such low-capability devices are wireless terminals which are typically limited in a couple of senses: First in terms of signalling capabilities, that is that a limited bandwidth signalling is possible and only half-duplex signalling is supported. Further the envisaged low capability devices are only capable to the receive signals from one frequency range, in particular of the serving base node of the cellular network, what restricts the capability to check for better suited base nodes.

In another aspect the limited-capability devices are also typically limited in terms of power resources. According to NB-IoT/eMTC specification they are supposed to operate with a battery life of 10 years. This requires that avoidable actions that consume power are suppressed as much as possible. E.g. such low-capability devices are configured to fall into a sleep mode as long as none of the rare connection sessions is open. When the connection session is open, low-capability devices may operate in enhanced coverage mode and therefore the connections last rather long, compared to other wireless terminals not operating in enhanced coverage mode. Enhanced coverage is the repeated reception or transmission of information to overcome high coupling loss between transmitter and receiver by accumulation.

On the other hand the evident suggestion of avoiding measurements requested by the serving base node would most probably lead to the situation that for the base node, where a multitude of low-capability devices is camping on, it is hard to get sufficient traffic reports or any other measurements to adjust the network settings, if necessary. The reason for that is that the low-capability devices are either sleeping, therefore they do not listen to the broadcast and other request, e.g. for measurement requests. Alternatively they are operating in connected mode in particular in enhanced coverage, then they are too busy and technology-wise too limited to receive measurement requests from the serving base node and in particular to carry out such measurements during the connection. This is especially the case when operating in coverage enhancements mode, because then measurements in particular relating to other base nodes' signals take extremely long i.e. at least as many samples for reception as currently with the serving base node are necessary. If either of the neighbor base nodes would have provided better reception conditions to the wireless terminal, it is very likely—in particular for a stationary wireless terminal—that it would have re-selected to the better suited serving base node. Then it would need less repetitions in advance. Furthermore the low-capability wireless terminal has only a narrowband receiver (NB). Should it need to tune to other frequencies for a longer time, it loses sync to serving cell and cannot maintain the open connection anymore.

The option to make the measurements at the end of the connection is disadvantageous as the base node then would potentially have to wait too long for receiving the requested measurements, in particular when a congestion needs to be detected or even access barring measures need to be taken.

It is therefore the goal of present invention to overcome the mentioned disadvantages and to propose a solution for an improved control of measurements at the low-capability devices by the cellular network resp. the base nodes. Further alternative and advantageous solutions would, accordingly, be desirable in the art.

SUMMARY OF THE INVENTION

For this it is according to a first aspect of the invention suggested a method for controlling measurements by a base node according to claim 1. It is further suggested according to a second aspect of the invention a base node according to claim 6. It is according to a third aspect of the invention proposed a method for executing measurements by a wireless terminal according to claim 8. Further it is according to a fourth aspect of the invention suggested a wireless terminal according to claim 15.

According to the first aspect of the invention it is proposed a method for controlling measurements by a base node of a cellular network, serving at least one low-capability wireless terminal in an open connection in coverage enhancement mode, the method comprising the steps of:

determining the coverage enhancement level of said wireless terminal, estimating a measurement time for carrying out said measurement taking into account said coverage enhancement level, sending a measurement request message in conjunction with a suspend connection message to the wireless terminal, providing a resume indication to the wireless terminal considering said estimated measurement time, retrieving at least one measurement response message from the wireless terminal comprising the at least one requested measurements.

The inventive method relates to a base node of a cellular network supporting low-capability devices. This is in particular the case for the sub-standards of the 4G resp. Long Term Evolution (LTE) standard defined in Release 14, that address machine-type-communication (MTC) devices, like LTE-CAT-M, NB-IoT etc. Base nodes in LTE are called eNodeB, and they form the access point on the air interface for the wireless terminal to the cellular network. Such wireless terminals are in particular devices with low processing power and limited bandwidth signaling. Such wireless terminals may have various shapes and use cases, e.g. smart metering devices, for home automation and asset tracking or point-of-sale (POS) devices.

The NB-IoT/eMTC standard promises battery life times at the wireless terminal of more than 10 years, and therefore such wireless terminals need to reduce its activities for reducing power consumption. This also includes the handling of measurements, in particular those that are not necessary for the wireless terminal itself, in particular its mobility. In particular stationary operated wireless terminals could save a lot of power consumption by avoiding its own measurements, which achievement would be jeopardized by plenty of cellular network initiated measurements.

On the other hand the base node of the cellular network requires measurements from the camping wireless terminal for maintaining load-balancing and finally even stability of the cellular network. Such measurement comprise in particular RSCP, RSRP, RX/TX or positioning measurements. Such measurements may in particular relate to other base nodes. As other base nodes in the surrounding of the current base node may on the one hand operate in overlapping frequency bands but also on the other hand in different frequency bands, there is further to distinguish between intra-frequency and inter-frequency measurements.

For a low-capability wireless terminals inter-frequency measurements mandatorily mean that the synchronization with the serving base node is lost, in particular in a running connection.

Moreover in the Release 14 technology standard definition it is planned to distinguish between anchor base nodes and non-anchor base nodes. The latter do not carry out broadcasts. The wireless terminal are supposed to operate on non-anchor base nodes, while there is a need to measure the anchor base nodes. As anchor base nodes and non-anchor base nodes use different frequencies, the need for inter-frequency measurements will even increase. This is because the non-anchor RSRP (Reference Signal Received Power) can be determined resp. deduced from the anchor base node, and also the difference between RSRP of anchor and non-anchor base nodes is of relevance. Anchor and non-anchor base nodes may both provide synchronization signals but not necessarily at the same periodicity and strength, i.e. a new accessing wireless terminal will follow the stronger signal and hence synchronize to the anchor base node if it transmits the stronger signal. As a consequence measurements of other cells need to be carried out against the anchor node, i.e. inter-frequency measurements will occur very often.

Here comes the invention into play which is supposed to achieve sufficient network requested measurements with simultaneously considering the power consumption and signalling capabilities of the requested wireless terminal. The inventive method starts from the situation of a low-capability wireless terminal camping on the base node, and operating in enhanced coverage mode. Enhanced coverage mode is a mode for wireless terminals operating in situations with bad coverage, e.g. a smart meter in the basement of a house or a vending machine in a parking garage. To enable communication each transmitted package needs to be transmitted repeatedly until the receiver is able to get enough coverage gain for decoding the transmitted signals. This applies both to uplink and downlink signalling.

The wireless terminal is further operating in an open connection with the base node. The open connection may have been initiated by the wireless terminal or the base node, resp. an incoming communication request.

The method starts with the step for the base node of determining the coverage enhancement level of the wireless terminal. With the coverage enhancement level it is estimated how many repetitions, in particular in average, are needed to decode a data packet from the wireless terminal. The coverage enhancement level may be either directly related to the repetition number, or distinguish the range in classes of repetitions.

Preferably this method step is carried out directly after registration resp. establishment of the connection. Further regular reevaluations are recommended.

The base node further figures out from its internal management control, what kind of measurements are needed for further operation. This collection may further be triggered by other cellular network components. If only one measurement is due, no such additional collection is needed.

From those determination steps the base node then carries out an estimation of the time it takes for the wireless terminal to carry out the planned at least one measurement. Such estimation step is at least considering the coverage enhancement level.

Further parameter are preferably further taken into account.

In a preferred embodiment it is suggested that step of estimating the measurement time further takes into account the number of frequencies to be measured by the wireless terminal.

With that embodiment it is considered for the duration estimation, that the more measurements resp. frequencies where such measurements need to be carry out are requested, the longer such measurements will take for the wireless terminal.

Preferably the resulting measurement time incorporates an additional security buffer for covering unexpected occurrences. Such security buffer is preferably determined through reviewing of previous estimations.

After the measurement time is estimated, the base node is sending a measurement request message to the wireless terminal. Such measurement request message is preferably a commonly known message type for that purpose, which potentially comprises a plurality of singular measurement requests.

In conjunction with the measurement request message the base node further sends a suspend connection message. In conjunction means at least one of in one transmission, prior or after the measurement request message within a short time period.

With this message it is envisaged to achieve that for conducting the requested measurements the connection is suspended. In other words the suspend connection message is an instruction by the base node to the wireless terminal, to suspend the connection, that is to change to idle mode. Accompanied with that the base node preferably indicates to the wireless terminal to maintain the connection context, which simplifies a later resume of the connection. Preferably a context ID exchanged, which is reused for later resume. Such it is assured that the switch to idle mode by the wireless terminal is not resulting in an aborted connection, but it is supposed to continue after the measurements have been done.

Consequently the base node also cares for a successful resume of the connection. For that it sends to the base node a resume indication which considers the estimated measurement time.

There are two embodiments foreseen how the resume indication is provided. According to the first option it is suggested that said resume indication comprises transmitting a resume message to the wireless terminal after said measurement time has expired, in case only intra-frequency measurements are requested.

This option comprises for the base node sending of a resume message to the wireless terminal once the estimated measurement time has expired. So in effect the base node stops the connection and after the estimated time has expired advantageously re-establishes it by direct assignment of cellular network resources for the connection.

This option is applicable when the wireless terminal is capable of receiving such resume message, which only reliably applies when it carries out intra-frequency measurements.

Alternatively it is also encompassed by the invention, that the resume message is repeated when no confirmation from the wireless terminal is received within a given timeframe. With that the wireless terminal could also conduct inter-frequency measurements and then synchronize again to the current base node and wait for the (next) resume message from the base node.

A faster way would then be the proposed second option.

According to the second option it is suggested that said resume indication comprises sending a time indication in conjunction with the suspend connection message to the wireless terminal for starting a timer in the wireless terminal, in case inter-frequency measurements are requested.

This option comprises that the wireless terminal gets a time indication from the base node, until it is expected to have completed the measurements. After that time has expired the wireless terminal is supposed to respond to the base node, preferably with the collected measurement reports, and by doing so resume the connection. Preferably such a message is a RACH (random access channel) message, according to the Random Access procedure introduced with LTE, inducing the base node to carry out a context fetching, and thus fully re-establish the connection and allocate resources from the base node.

After the resume is carried out, the wireless terminal is in the position to send at least one measurement report message to the base node comprising the results of the measurements.

The shown inventive method advantageously solves the trade-off between power-saving and the need for measurements from the wireless terminals. Through the connection suspension only wireless terminals which are anyhow active, and even in a connection, are addressed. Therefore during other times the wireless terminal may fall into a sleep mode, as it does not have to expect measurement request messages when operating in idle mode. This approach further saves all lead efforts and power consumptions for waking up for doing such measurements.

Further it is advantageous that the base node may chose a time for the measurements instead of potentially waiting for the wireless terminal to wake up or finish a running connection. As the wireless terminal is operating in enhanced coverage mode the connection is presumably running for a comparably long time. Hence a quick response cannot be expected.

With the base node estimating the measurement time it has further the possibility to select among a plurality of camping wireless terminals which are able to receive and handle measurement requests, which of the wireless terminals will quickly respond.

According to an additional advantageous embodiment it is proposed that the method further comprising reception of a stationary indication from the wireless terminal prior to setting up the connection, wherein the base node is sending an indication to the wireless terminal in conjunction with the measurement request message that indicates to the wireless terminal to allow looking up measurements carried out prior to the request for measurements.

This embodiment is based on the fact that wireless terminals may carry out measurements independent of the base nodes instructions. E.g. checking of the suitability of the current base node in comparison with other base nodes in the proximity is a useful task, in particular just before setting up a connection, in particular if this happens right after waking up from a sleep phase. This also applies to stationary wireless terminals, as they have to react on changes in the cellular network's topology.

Such earlier measurements are stored in the memory of the wireless terminal, and looked up, when the measurements request comes in within a predetermined time since the measurement is carried out.

Looking up previous measurements however is only useful when the wireless terminal is operating stationary, otherwise the earlier measurements are not usable when the wireless terminal meanwhile has moved. Therefore when the base node earlier received an indication from the wireless terminal, that it is operating stationary, then the base node preferably instructs the wireless terminal with an indication if it allows instead of real fresh measurements also stored ones. Preferably the indication also comprises the maximum age of the measurements.

If the measurement request message comprises more than one measurement request, then each measurement request is checked if the measurements were already carried out and are not outdated, and if this is the case and the base node allows looking up earlier measurements then for each measurement request where earlier measurements are available and not outdated, those stored measurement results are looked up and delivered to the base node. For the rest the requested measurement has to be carried out of course.

The effect of this embodiment is apparent: First the wireless terminal does not have to invest power resources for making measurements it anyhow just carried out. Second the results are delivered much faster than with an ad hoc measurement upon reception of the measurement request.

According to the second aspect of the invention it is proposed a base node of a cellular network serving at least one low-capability wireless terminal in an open connection in enhanced coverage mode, wherein the base node is configured to:
  determine the coverage enhancement level of said wireless terminal,
  send a measurement request message in conjunction with a suspend connection message to the wireless terminal,
  estimate a measurement time for carrying out said measurement taking into account said coverage enhancement level,
  provide a resume indication to the wireless terminal considering said estimated measurement time,
  retrieve at least one measurement response message from the wireless terminal comprising the at least one requested measurements.

The second aspect of the invention shares the advantages of the first aspect. The base node in particular comprises transmitting and receiving circuitry for communicating over the air interface with a plurality of wireless terminals. Further it comprises processing circuitry, memory and power supply as well as communication circuitry for communicating with other cellular network components like MME, core network components and other base nodes of the same cellular network or RAN.

According to the third aspect of the invention it is suggested a method for executing measurements by a wireless terminal operating with a base node of a cellular network, the wireless terminal being a low-capability terminal, the wireless terminal further operating in an open connection with said base node in coverage enhancement mode, the method comprising the step of:
  receiving from the base node a request for suspending the connection in conjunction with a measurement request message,
  suspending the connection,
  determining the at least one requested measurement, upon detection of occurrence of a resume indication, resuming the connection, transmitting at least one measurement response message comprising the at least one requested measurement, continuing the open connection.

The method according to the third aspect of the invention is carried out by the wireless terminal. It comprises the complementary method steps for the method according to the first aspect of the invention.

It relates to a low-capability wireless terminal operating in enhanced coverage mode. As such the wireless terminal is preferably operating in a sleep mode. Typically according to a schedule the wireless terminal wakes up for exchanging data with the cellular network or a remote server or device. For that it is operating in connected mode, preferably by setting up the connection with the serving base node through a common resource request. During the open connection the wireless terminal is capable of receiving messages from the serving base node. It is further able to handle a request for suspending the connection in conjunction with a request for measurements received from the serving base node. The wireless terminal is preferably capable of receiving both instructions within one message, or in an arbitrary order.

In response to receiving such instructions the next step comprises that the wireless terminal suspends the connection. This means the wireless terminal switches from connected mode preferably to idle mode.

For carrying out the requested measurements this is necessary as a low-capability wireless terminal is not capable to maintain the connection and carry out measurements in parallel.

In the next step the wireless terminal then determines the requested measurements. The type of measurements are already mentioned for the first aspect of the invention.

Preferably the step of determining the at least one requested measurement comprises measuring signals from at least one second base node different from the base node the wireless terminal is operating with.

That means the wireless terminal synchronizes to the at least one second base node and carries out the requested measurements.

Alternatively the step of determining the requested measurement comprises looking up measurements carried out prior to the reception of the measurement request message, in case said earlier measurement has been carried out within a predetermined time limit before receiving the measurement request message.

According to this embodiment the wireless terminal looks up measurements which were carried out and stored short before receiving the measurement request from the base node. As long as the stored measurement is not outdated, the wireless terminal advantageously looks up the stored measurement and provides this to the base node.

Preferably the looking up is carried out when the wireless terminal previously sent an indication to the cellular network indicating that it is operating stationary and the wireless terminal received an indication from the base node allowing looking up measurements.

As the stored measurements are only valid, when the wireless terminal is operating stationary, the wireless terminal preferably informs ahead the serving base node with an information element indicating the feature of operating stationary. The information element may preferably be provided upon registration, camping or setting up the connection.

The base node may in response inform the wireless terminal, preferably together with the measurement request, that such previously carried out measurement are allowed for submission, or not.

It is advantageous to wait for the approval from the base node, as the wireless terminal cannot rate, if not fully up to date measurements are good enough or not. In particular when a network change, like a topology change or other measures like a barring instruction was happening right before, then the base node will preferably disallow measurements from before this event, as they are then useless although the predetermined time period has not expired.

In the next step the wireless terminal on occasion of a resume indication from the base node resumes the connection and transmits a measurements response comprising the requested measurements.

Preferably said resume indication comprises at least one of:

the reception of a resume message from the base node, or the expiry of a timer in the wireless terminal set by a time indication received from the base node in conjunction with the suspend connection message.

According to this embodiment the resume indication is to be handled like triggering an event.

The event may as a first alternative be the reception of a resume message from the base node. This is in particular applicable for measurement requests relating to intra-frequency measurements. For such intra-frequency measurements the wireless terminal does not have to retune on another frequency compared to the serving base node's frequency and consequently is able to receive the resume message from the base node. With that the time based control remains with the base node, which can after expiry of the estimated time for the measurements, which in particular has to take into account at least the coverage enhancement level of the wireless terminal, send the resume message to the wireless terminal.

According to the second alternative the event relates to a timer started in the wireless terminal after reception of the measurement request and set by the time indication from the base node, which also takes into account said coverage enhancement level.

This alternative is preferably used in case of inter-frequency measurements. In that case the wireless terminal would most probably not be able to receive a resume message from the base node.

When the resume indication event is triggered, the wireless terminal resumes the connection again.

Resuming the connection preferably connection comprises at least one of:

sending a RACH message inducing the base node to carry out context fetching, reception of a resume message indicating a direct assignment of network resources from the base node.

The first option is initiated by the wireless terminal while the second is triggered by the base node. Therefore the latter option is preferably for the case of intra-frequency measurements. Preferably the resume message indicating the direct assignment from the base node is at the same time the resume indication from the base node, as explained before.

The measurements are then transmitted to the base node as part of measurement response messages comprising the requested measurements. After resuming the connection the wireless terminal and the base node continue with the connection and exchange data packets as before.

In another preferred embodiment it is proposed that in case of carrying out a cell reselection to a second base node during the suspension period, the method further comprising the step of transmitting at measurement response message comprising a context identifier used by the previous base node and a base node identifier received from the previous base node.

This embodiment handles the case that during the suspension the wireless terminal detects, that another base node is more suitable for the wireless terminal than the current serving base node, which sent the measurement request that is currently worked on.

It would be disadvantageous to remain with the current base node, hereinafter the first base node, in particular when the better suited base node, hereinafter the second base node, would also lead to less power consumption for the wireless terminal when operating with it.

Therefore a cell reselection is not suppressed during the suspension period.

Hence the proposed embodiment suggests a solution for the case of a cell reselection. Nonetheless the first base node still expects the measurement results.

Therefore the wireless terminal concludes with its measurements and transmits the measurement response message to the—now serving—second base node. For assuring that the first base node receives the results, the measurement response message further comprises a base node identifier of the first base node and a context identifier.

With the base node identifier the second base node detects which base node is interested in the received measurements and is able to forward the measurements.

Further the second base node now has the task to reconstruct the context of the connection which is now supposed to be resumed. With sending the context identifier, that the wireless terminal received some times before from the first base node, the second base node can liaise with the first base node and transfer the required information for reconstructing the context, and the connection is successfully resumed. The operations carried out between the first and second base node are preferably similar to operations carried out in conjunction to a hand over operation.

This embodiment is advantageous as it offers a solution for allowing cell reselection during a suspended connection, resulting in a better power consumption behavior of the wireless terminal and nonetheless the first base node receives the requested measurements. Further the second base node may also take advantage of the received measurements.

According to the fourth aspect of the invention it is proposed a wireless terminal for operating in a cellular network comprising at least one base node, the wireless terminal being a low-capability terminal, configured to operate with the base node and maintain an open connection in coverage enhancement mode, wherein the wireless terminal is further configured to:
  receive from the base node a request for suspending the connection in conjunction with a measurement request message,
  suspend the connection,
  determine the at least one requested measurement,
  upon detection of occurrence of a resume indication, resume the connection,
  transmit at least one measurement response message comprising the at least one requested measurement,
  continue the open connection.

The fourth aspect shares the advantages of the third aspect. It relates to a wireless terminal which is a low-capability terminal. It comprises transmission and receiving circuitry, a processor, memory and a power supply, in particular a battery. It is configured to operate with a base node according to the second aspect of the invention.

As it is shown this invention advantageously solves the depicted problem and the proposed invention is flexible enough to react on the current situation of a base node with a wireless terminal. It reliably and fast provides the base node with the requested measurements by not straining the wireless terminal with too high efforts which could effect in overly power consumption.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 3 shows a flow chart showing an embodiment of the method the invention is related to.

Figure 1:
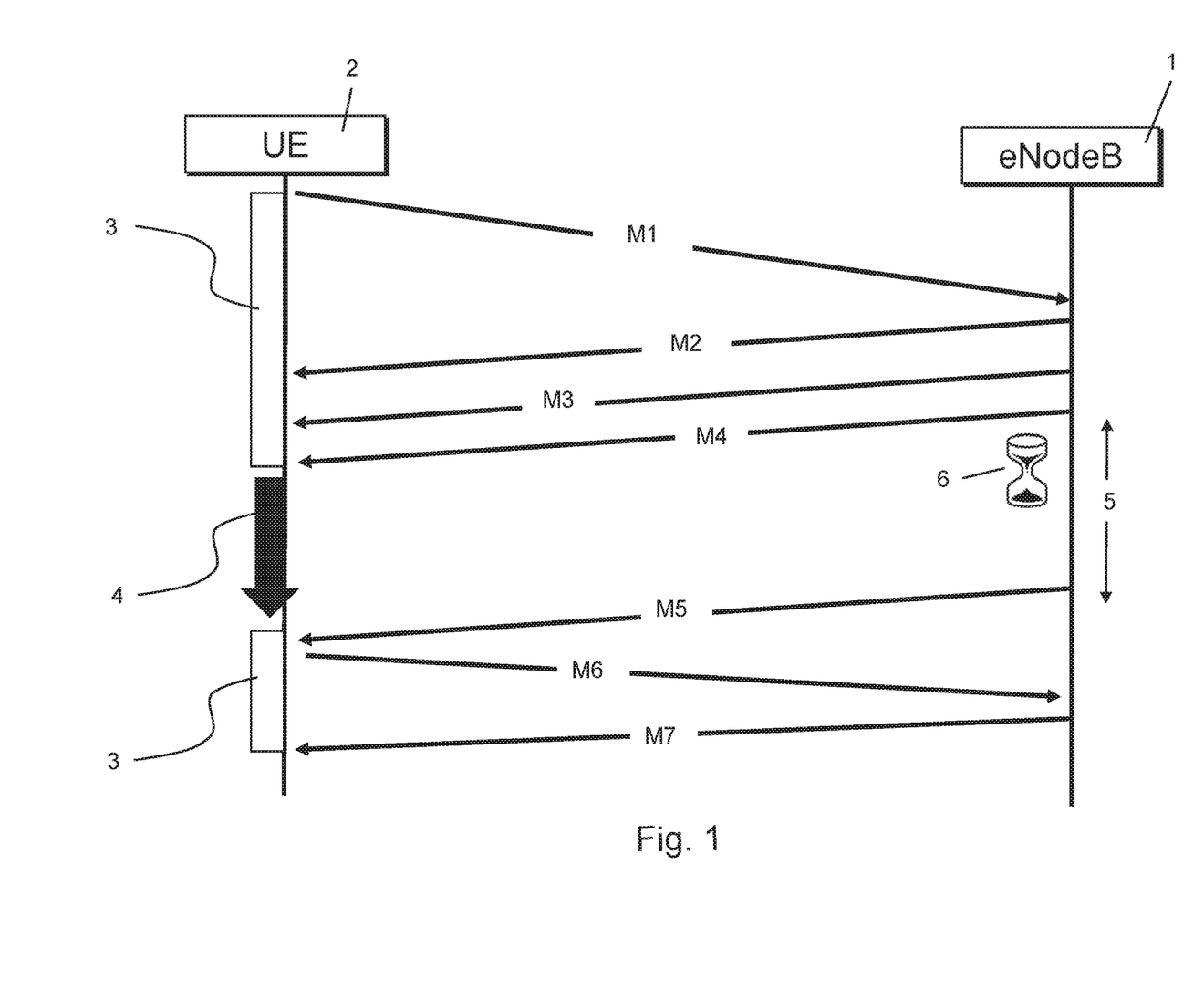
FIG. 1 represents a first message flow between a wireless terminal and a base node of the type to which the present invention is applied as an embodiment.

In FIG. 1 it is shown the exemplary message flow between a base node 1 and a wireless terminal 2 of the type to which the present invention is applied as an embodiment. The wireless terminal 2 is user equipment (UE) which is equipped as a low-capability device, which in this exemplifying embodiment means a NB-IoT device with limited hardware resources both in terms of signalling bandwidth and power supply. It comprises transmission and receiving circuitry, a processor, memory and a power supply, in particular a battery.

The wireless terminal 2 is operating with a base node 1, the so called serving base node, which in the context of LTE—where NB-IoT is a developed flavour of—is a so-called eNodeB. The base node is part of a cellular network, in particular the LTE radio access network (RAN), and is configured to support NB-IoT wireless terminals. It is also equipped with transmitting and receiving circuitry, processor, memory and power supply. It further comprises communication circuitry for communicating with other cellular network components like MME, core network components and other base nodes of the same cellular network resp. RAN.

The wireless terminal is in particular a smart metering device positioned in the basement of a house, which means it is operating in enhanced coverage. It operates in sleep mode most of the time, but wakes up at defined time points where it is supposed to send measured data and/or receive data from a remote server or device.

Depending on the amount of data to be transmitted this data transmission resp. reception requires more time than with wireless terminals operating in normal mode as each data packet needs to be transmitted repeatedly. Further the limited signalling bandwidth leads to the situation that practically all data packets are sent sequentially instead of parallel transmission over multiple channels. This also includes that the wireless terminal is unable to listen to or transmit on other frequency ranges in parallel to the communication with the serving base node 1.

Due to that the wireless terminal 2 is practically either operating in the sleep mode or in an open connection. Measurement requests from the base node 1 are according to the present invention possible in conjunction with an open connection.

For doing so the wireless terminal 2 in present embodiment opens with message M1 a connection with the base node 1 and exchanges data packets, in particular by repeated transmission. Such a connection is either opened by the wireless terminal or through paging from the base node. It may be scheduled communication or an ad hoc communication, that is the connection was planned or is set up event based.

The connection may be open for a while and exchange data packets in enhanced coverage mode. For a low-capability wireless terminal only supporting half-duplex, data transmission and reception between wireless terminal and base node alternate. The reception of data packets from the wireless terminal is acknowledged with message M2.

When during the open connection the base node 1 realizes the need for measurements at least from said wireless terminal 2, it has according to the invention the possibility during an open connection to instruct the wireless terminal to carry out such measurements.

The requested measurements are in particular those that are not necessary for the mobility of the wireless terminal, but those that are needed by the cellular network resp. the base node for maintaining its stability. Among these are in particular RSCP, RX/TX or positioning measurements.

It is part of the inventive concept that a plurality of measurements may be requested within one task.

For instructing the wireless terminal to carry out such measurements it is according to this preferred embodiment of the invention proposed that the base node sends a measurement request message M3 to the wireless terminal. The issue to solve is that the wireless terminal is generally not capable of carrying out such measurements in parallel to the open connection. In some cases, in particular intra-frequency measurements parallel measurements are possible, but for others, in particular inter-frequency measurements it is not. As such measurements also belong to those that are needed by the base node, a solution is needed.

According to presently shown embodiment therefore the invention proposes that in conjunction with the measurement request M3 a request for suspending the connection M4 is submitted to the wireless terminal.

Preferably the messages M2, M3, and M4, or at least a subset of it, are submitted within one transmission. A separate submission of each message is however encompassed by the invention as well.

With the suspend request M4 the wireless terminal is instructed to switch from connected mode 3 to idle mode 4. In parallel the connection context 5 is maintained at the base node's site. Such it is assured that when the connection is later resumed, it can continue with the same context 5 and without delay or loss of data.

A critical issue is in fact, how long the suspension is supposed to last. As it is the base node that is controlling the measurements it is not possible to put the measurements in the discretion of the wireless terminal. This would mean the wireless terminal can decide if and when to make such measurements. On the other hand for a low-capability device operating in enhanced coverage carrying out a plurality of measurements will take a remarkable amount of time.

Therefore it is the base node 1 that takes all such parameter into account, at least the enhanced coverage level, and preferably the number of instructed measurements and estimates a measurement time for the wireless terminal. In the shown embodiment it is the base node which holds a timer 6 that is running until the estimated measurement time is reached. The estimated measurement time preferably has some safety buffer in order to cover some delays.

After the timer 5 expires, the base node sends a resume message M5 to the wireless terminal 2.

When the measurements are not finished, the wireless terminal preferably ignores the message M5, or sends an indication that the measurements are not finished yet to the base node. Then the base node would at a later point in time, in particular after a predefined time offset, send again the resume message M5.

When the wireless terminal has finished the requested measurements during the idle mode phase 4, it is in the position to submit the measurement results with message M6 to the base node, and resumes synchronously to this the suspended connection.

The wireless terminal is however only able to receive the resume message M5 when it is synchronized to the base node 1, and not operating in another frequency range of a second base node operating in a different frequency range. The reception is only possible when the requested measurements are only intra-frequency measurements, or the wireless terminal has after finishing the measurements again synchronized on base node 1.

After resuming the suspended connection the wireless terminal continues operating in connected mode 3 until the connection is released by the base node or the wireless terminal with the release message M7.

Figure 2:
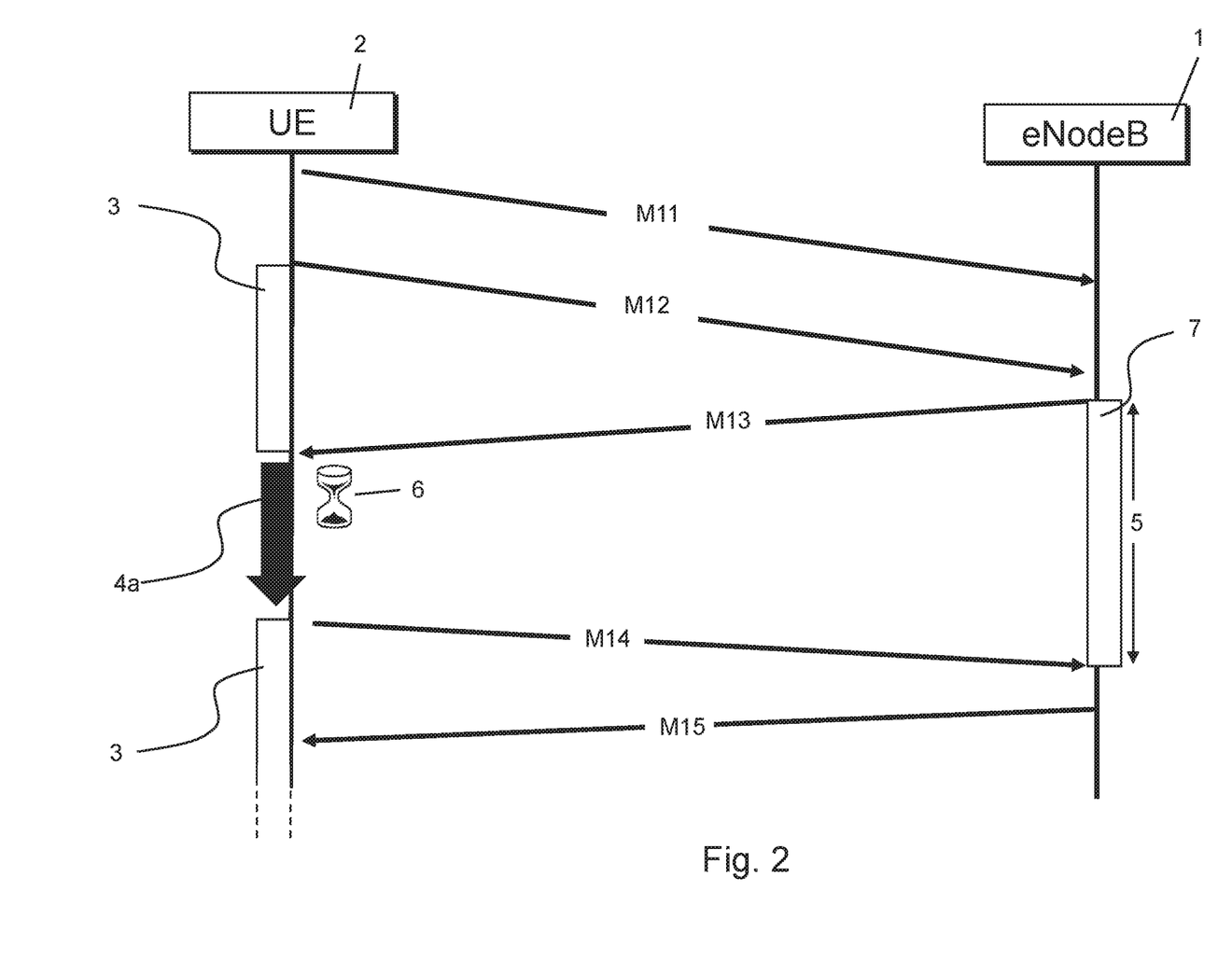
FIG. 2 represents a second message flow between a wireless terminal and a base node of the type to which the present invention is applied as an embodiment.

An alternative embodiment of the same message flow is shown in FIG. 2. Basically it could happen between the same wireless terminal 2 and base node 1 as before, but for a different scenario of measurements.

First the procedure starts with a message M11 from the wireless terminal 2 to the base node 1, the message providing an information element indicating that the wireless terminal 2 is operating stationary. This is for example the case for a smart metering device or a home automation terminal fixed on the wall of a house. The characteristics of being stationary may be entered manually or is detected by the wireless terminal 2 itself. The message M11 is in particular provided upon registration resp. camping on the base node 1. It may in particular be provided upon first registration in the cellular network regardless of on which base node this has happened.

With message M12 the wireless terminal opens the connection to the base node 1, and subsequently exchanges data packets as it is the case for message M1 in FIG. 1. In the following the wireless terminal is operating in connected mode 3.

With message M13 the base node sends to the wireless terminal a combined message practically incorporating the content of the messages M2, M3, M4 from before. In order to do so the base node previously detected the coverage enhancement level of the wireless terminal and collects a list of requested measurements. As a result, message M13 also comprises a resume indication comprising a time for executing the measurements, which time is determined at least based on the detected coverage enhancement level and the requested measurements. An additional safety buffer is preferably further considered.

With this embodiment it is the receiving wireless terminal 2 that maintains a timer 6. During the time of measurements the base node waits for the waiting period 7 for the results from the wireless terminal and during that waiting period maintains the context 5 of the communication.

An additional indication as part of message M13 is relating to the way of measurement. When a wireless terminal is operating stationary, previously executed measurements may be sufficiently accurate, as long as they are not older than a predetermined threshold time period. The base node 1 can therefore indicate to a wireless terminal, which earlier indicated to be a stationary device, that the results of previously executed and not outdated measurements may be reported to the base node.

In the scenario shown in FIG. 2 it is therefore in case of allowance by the base node up to the wireless terminal to carry out the requested measurements or retrieve previously carried out measurements. Only in the first case it is then necessary to suspend the connection and change to idle mode 4a. Of course a reduced idle mode 4a may indeed possible to retrieve only parts of the requested measurements.

By means of the resume indication the wireless terminal sets its timer 6 and when the measurements have been carried out, the wireless terminal sends a message M14 to the base node, submitting the measurement reports and indicating to resume the connection. Preferably the message M14 is a RACH message to the base node, which initiates the base node to carry out a context fetching, that is recreating the context for the further processing. By the confirmation message M17 the context and subsequently connection re-establishment is confirmed to the wireless terminal 2.

After that the wireless terminal is in the connected mode 3 again and can continue with the data transmissions.

It needs to be mentioned, that the FIGS. 1+2 simplify the message flow, as the wireless terminal is typically operating in enhanced coverage mode. Therefore each transmitted message needs to be transmitted repeatedly until the receiver is able to get enough coverage gain for decoding the transmitted signals.

Figure 3:
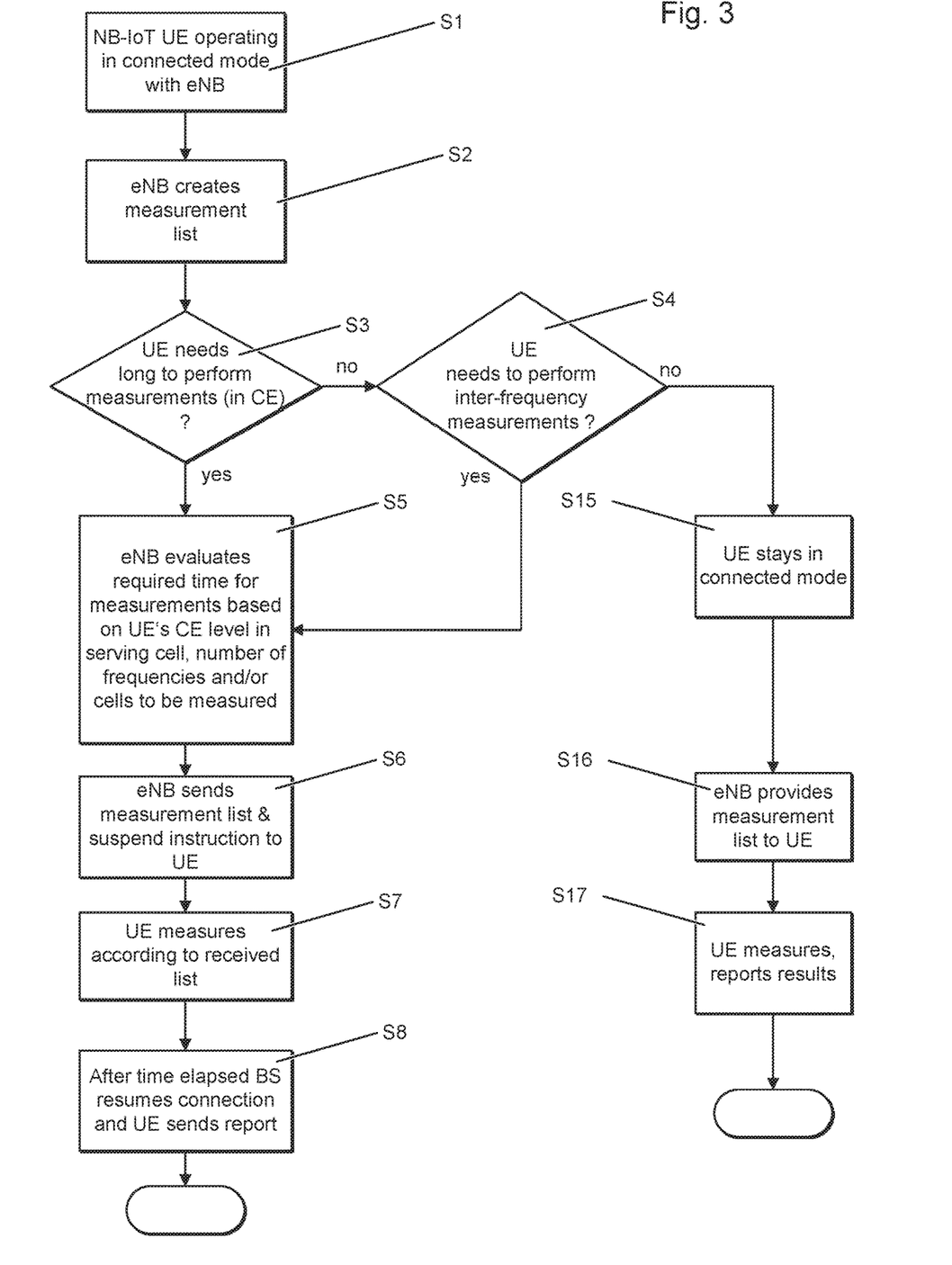

FIG. 3 shows by way of a flow chart another preferred embodiment of the invention. It starts with step S1 where a NB-IoT wireless terminal is operating in connected mode with a base node (eNodeB). In step S2 the base node creates a list of measurements that need to be carried out by at least one wireless terminal camping on the base node.

For the present wireless terminal the base node first checks in step S3 if it needs comparably long to perform such measurement. This is in particular the case when it is operating in enhanced coverage mode, and in particular above a certain threshold enhanced coverage level. For the wireless terminal that means, that it is for a remarkable amount of time blocked for such measurements and cannot continue the data transmission as part of the open connection.

If this is not the case, then the base node checks in step S4 if inter-frequency measurements need to be carried out. These are in particular measurements relating to base nodes operating in another frequency range as the current base node. NB-IoT devices are unable to maintain the synchronisation to the current base node when doing such measurements, regardless of operating in enhanced coverage mode or not.

If either of the conditions in S3 and S4 applies, therefore the process flow branches to step S5. Otherwise it branches to step S15.

In step S5 the base node evaluates based on a plurality of parameter, including the coverage enhancement level and the number of requested measurement, how much time the wireless terminal is supposed to require for executing the requested measurements.

As an outcome the base node sends to the wireless terminal the determined measurement list and a suspend instruction in step S6.

In this embodiment it is the base node who is controlling the time for measurement. Therefore the wireless terminal is carrying out the measurements in step S7. After expiry of the estimated time for measurements it is then the base node which sends a resume connection message to the wireless terminal in step S8 and gets in return the requested measurement reports. This scenarios basically complements to the message flow shown in FIG. 1. It assumes that at least when the time for measurements has expired the wireless terminal is synchronized for receiving the resume connection message from the base node. In case the wireless terminal meanwhile carried out inter-frequency measurements, as it is checked in step S4, then these have to be concluded and the wireless terminal has enough time to synchronize again on current base node. It is therefore preferred to add in case of inter-frequency measurements an additional time buffer to the estimated measurement time, as the synchronization needs to be taken into account as well.

Should none of the conditions checked in step S3 and S4 apply, then the procedure carries on in step S15. Here the normal procedure of measurement reports is carried out. In this scenario a NB-IoT device which is not operating in enhanced coverage mode, at least not beyond a certain enhanced coverage level, and is supposed to carry out intra-frequency measurements, is preferably not supposed to suspend the running connection for carrying out said measurements. Hence the UE stays in step S15 in connected mode and the base node provides the wireless terminal with the list of measurements. Then the wireless terminal carries out the measurements and provides in step S17 the measurement reports to the base node. The wireless terminal can maintain the connection as it is still synchronized with the current base node, and the time for measurements is sufficiently short in order to continue the connection shortly thereafter without the need for a suspension.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for controlling at least one measurement by a base node of a cellular network, the base node serving at least one low-capability wireless terminal in an open connection in coverage enhancement mode,
the method comprising the steps of:
determining a current coverage enhancement level of said wireless terminal, estimating a measurement time for carrying out said at least one measurement based on said current coverage enhancement level,
sending a measurement request message in conjunction with a suspend connection message to the wireless terminal,
providing a resume indication to the wireless terminal considering said estimated measurement time, wherein providing said resume indication comprises transmitting a resume message to the wireless terminal after said measurement time has expired, in case only intra-frequency measurements are requested, and
retrieving at least one measurement response message from the wireless terminal comprising the at least one requested measurement.

2. Method according to claim 1,
further comprising reception of a stationary indication from the wireless terminal prior to setting up the connection,
wherein the base node sends an indication to the wireless terminal in conjunction with the measurement request message that indicates to the wireless terminal to allow looking up measurements carried out prior to the request for measurements.

3. Method according to claim 1,
wherein the step of estimating the measurement time further takes into account the number of frequencies to be measured by the wireless terminal.

4. Base node of a cellular network serving at least one low-capability wireless terminal in an open connection in enhanced coverage mode, wherein the base node is configured to:
receive a stationary indication from the wireless terminal prior to setting up the connection,
determine a current coverage enhancement level of said wireless terminal,
send a measurement request message in conjunction with a suspend connection message to the wireless terminal,
send an indication to the wireless terminal in conjunction with the measurement request message that indicates to the wireless terminal to allow looking up measurements carried out prior to the request for measurements,
estimate a measurement time for carrying out said at least one measurement based on said current coverage enhancement level,
provide a resume indication to the wireless terminal considering said estimated measurement time, and
retrieve at least one measurement response message from the wireless terminal comprising the at least one requested measurement.

5. Method for executing measurements by a wireless terminal operating with a base node of a cellular network, the wireless terminal being a low-capability terminal, the wireless terminal further operating in an open connection with said base node in coverage enhancement mode,
the method comprising the step of:
receiving, from the base node, (a) a request for suspending the connection, (b) a measurement request message, and (c) an estimated measurement time for carrying out at least one requested measurement determined based on a current coverage enhancement level of said wireless terminal,
suspending the connection,
determining the at least one requested measurement, wherein the step of determining the at least one requested measurement comprises looking up measurements carried out prior to the reception of the measurement request message, in case said earlier measurement has been carried out within a predetermined time limit before receiving the measurement request message,
once the estimated measurement time since suspending the connection has elapsed, resuming the connection,
transmitting at least one measurement response message comprising the at least one requested measurement, and
continuing the open connection.

6. Method according to claim 5,
wherein resuming the connection comprises at least one of:
sending a RACH message inducing the base node to carry out context fetching, or
reception of a resume message indicating a direct assignment of network resources from the base node.

7. Method according to claim 5,
wherein the step of determining the at least one requested measurement comprises measuring signals from at least one second base node different from the base node the wireless terminal is operating with.

8. Method according to claim 5,
wherein the looking up is carried out when the wireless terminal previously sent an indication to the cellular network indicating that it is operating stationary and the wireless terminal received an indication from the base node allowing looking up measurements.

9. Method according to claim 5,
further comprising that in case of carrying out a cell reselection to a second base node during the suspension period, the method further comprising the step of transmitting at least one measurement response message comprising a context identifier used by the previous base node and a base node identifier received from the previous base node.

10. Wireless terminal for operating in a cellular network comprising at least one base node, the wireless terminal being a low-capability terminal, configured to operate with the base node and maintain an open connection in coverage enhancement mode, wherein the wireless terminal is further configured to:
receive, from the base node, (a) a request for suspending the connection, (b) a measurement request message, and (c) an estimated measurement time for carrying at least one requested measurement determined based on a current coverage enhancement level of said wireless terminal,
suspend the connection,
determine the at least one requested measurement,
once the estimated measurement time since suspending the connection has elapsed, resume the connection,
transmit at least one measurement response message comprising the at least one requested measurement, wherein in case of carrying out a cell reselection to a second base node during the suspension period, the at least one measurement response message comprises a context identifier used by a previous base node and a base node identifier received from the previous base node, and
continue the open connection.

11. Method for controlling at least one measurement by a base node of a cellular network, the base node serving at least one low-capability wireless terminal in an open connection in coverage enhancement mode,
the method comprising the steps of:

determining a current coverage enhancement level of said wireless terminal, estimating a measurement time for carrying out said at least one measurement based on said current coverage enhancement level, sending a measurement request message in conjunction with a suspend connection message to the wireless terminal, providing a resume indication to the wireless terminal considering said estimated measurement time, wherein said resume indication comprises sending a time indication in conjunction with the suspend connection message to the wireless terminal for starting a timer in the wireless terminal, in case inter-frequency measurements are requested, and retrieving at least one measurement response message from the wireless terminal comprising the at least one requested measurement.

\* \* \* \* \*